United States Patent [19]

Proehl

[11] Patent Number: 4,826,219
[45] Date of Patent: May 2, 1989

[54] HYDRAULIC DREDGE PIPELINE COUPLING

[76] Inventor: Norman P. Proehl, 373 E. Westminster Ave., Lake Forest, Ill. 60045

[21] Appl. No.: 165,019

[22] Filed: Mar. 7, 1988

[51] Int. Cl.$^4$ .................. F16L 21/04; F16L 35/00
[52] U.S. Cl. .................... 285/356; 285/114; 285/377
[58] Field of Search ............ 285/114, 236, 356, 377

[56] References Cited

U.S. PATENT DOCUMENTS

| | | |
|---|---|---|
| 2,363,526 | 11/1944 | Hobbs . |
| 2,536,216 | 1/1951 | Powell ............................ 285/114 X |
| 3,029,094 | 4/1962 | Parlasca et al. ..................... 285/114 |
| 3,206,229 | 9/1965 | Kramer .............................. 285/114 |
| 3,232,640 | 2/1966 | Donkle, Jr. ........................ 285/114 X |
| 3,984,131 | 10/1976 | Gingrich, Jr. ......................... 285/41 |
| 3,997,199 | 12/1976 | Arnold ............................... 285/322 |
| 4,170,375 | 10/1979 | Ito ..................................... 285/348 |
| 4,506,919 | 3/1985 | Peting ............................... 285/231 |
| 4,679,830 | 7/1987 | Kok .................................... 285/323 |
| 4,699,405 | 10/1987 | Miller ................................ 285/338 |

FOREIGN PATENT DOCUMENTS 602547 5/1935 Fed. Rep. of Germany ...... 285/114

Primary Examiner—Thomas F. Callaghan
Attorney, Agent, or Firm—Kinzer, Plyer, Dorn, McEachran & Jambor

[57] ABSTRACT

A smooth bore, self-aligning connection for pipes of the type used in hydraulic dredging. In this connection, the spigot end of one pipe contacts metal to metal at the bell end of the other pipe. A packing gland is defined outwardly of the contacting pipe ends by a positioning ring toe and an annular ring of the bell. A third annular ring on the bell end engages a stepped ring on the spigot end to align the pipes longitudinally as well as radially. A locking ring which is threadedly adjustable engages a skirt depending from a fourth annular ring formed on the bell to lock the spigot end of the pipe to the bell end. The bell and spigot connection of this invention is also adaptable to a pontoon pipe having a flexible reinforced rubber hose section between the spigot and bell ends of a pipe.

1 Claim, 2 Drawing Sheets

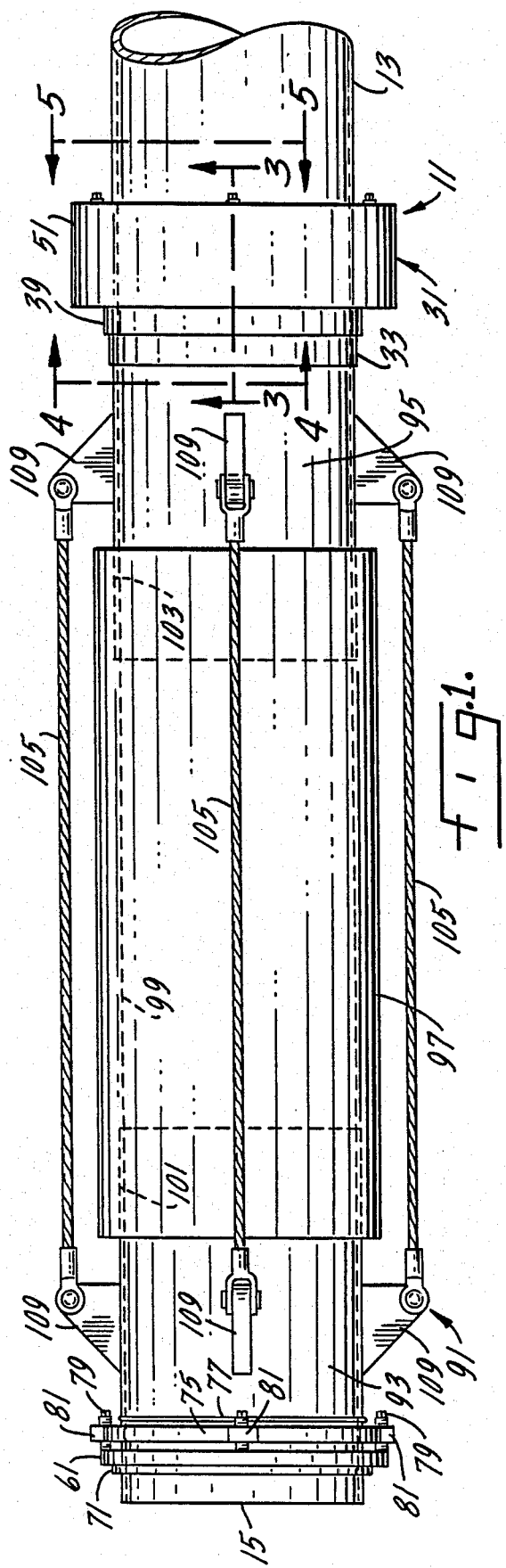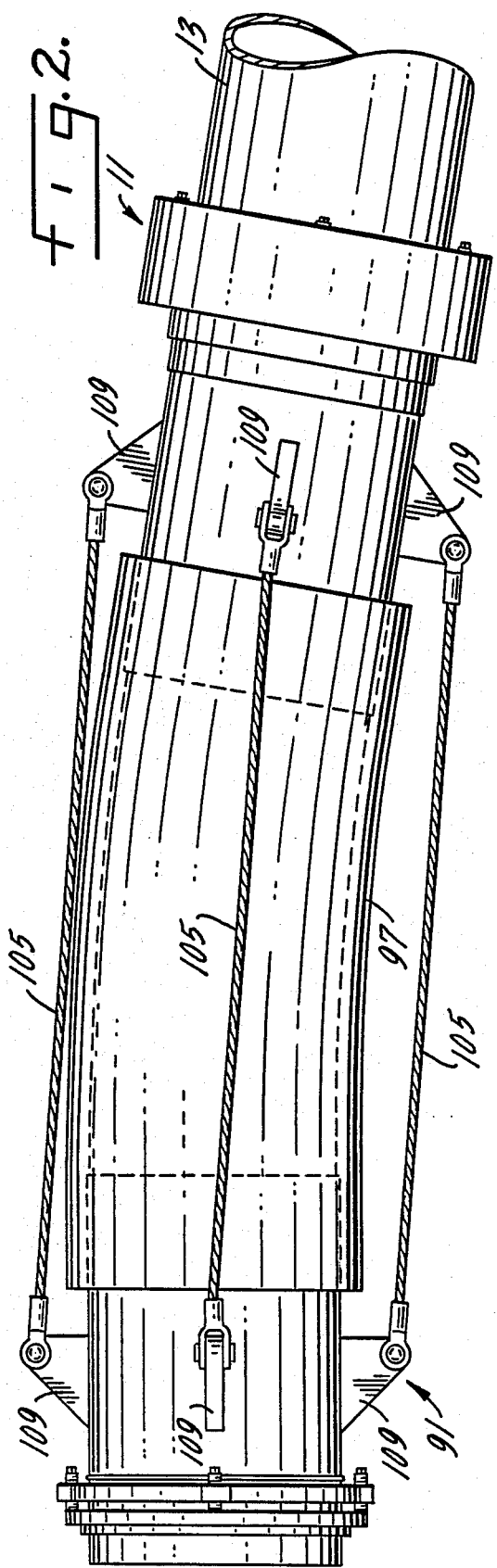

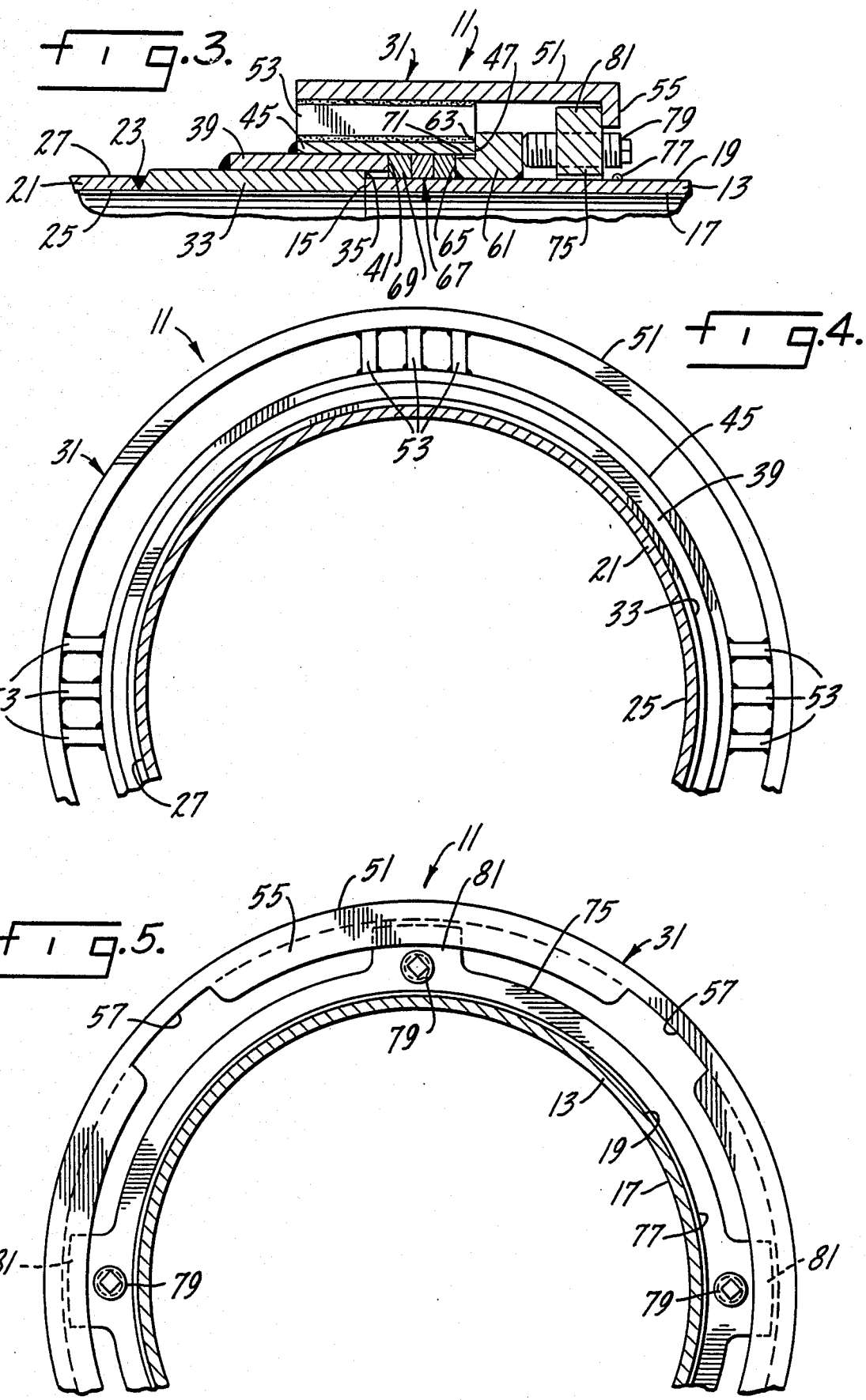

HYDRAULIC DREDGE PIPELINE COUPLING

SUMMARY AND BACKGROUND OF THE INVENTION

The invention is concerned with a coupling for pipe of the type that is used in the hydraulic dredging industry and particularly with pipe that is used as dredge shore pipe and pontoon pipe.

The provision of adequate tension, compression and torsion strength in couplings of the steel pipe used for pontoon pipe and dredge shore pipe is important because of the high stresses applied to couplings of this type of pipe in normal use. For example, pontoon pipe which extends from the floating dredge to the shore or a spoil barge is subjected continuously to forces of wind and current, and to the forces which are applied when the pontoon pipe is moved under tow when it is being relocated. Flexibility in pontoon pipe lines is presently obtained through the use of ball joints or rubber sleeves between pipe lengths. Ball joints are in common use today but have the real disadvantage of extremely poor hydraulic characteristics. Slurry flow in a pipe travels at a certain speed or velocity. Since the inside of the ball necessarily has a larger cross-sectional area than the pipe, the velocity of flow is suddenly reduced when slurry enters the ball. When the slurry leaves the ball, it passes through the ball exit which is the diameter of the pipe. Upon leaving the ball, the slurry enters the bell when it experiences a second expansion and drop in velocity. Upon leaving the bell, the slurry enters the pipe, which has a smaller inside diameter than that of the bell. The result is that a ball joint is a consumer of power. A purpose of my invention is to reduce this consumption of power by using a smooth bore, flexible pontoon pipe connection. The ball joint is competent in tension. The use of rubber sleeves to provide flexibility between pontoon pipes is not extensive because rubber sleeves cannot withstand tension nor can they withstand bending. My pontoon pipe provides both flexibility and resistance to separation due to tensile forces.

The shore pipe which leads from the pontoon pipe to the spoil area is often laid over rugged ground and therefore may extend up and down hills. Movement in the couplings of shore pipe results in leakage and can even culminate in separation of the pipe. Further, the couplings of such pipe are stressed by the pulsations of the slurries of dredged material that are forced through the pipe by the hydraulic pump of the dredge.

Previous couplings for shore dredging pipe have been concerned with the prevention of leakage but have not attempted to form a coupling that would prevent separation of the pipe caused by the large tension and torsion forces that are experienced during dredging operations. The couplings that have provided a mechanical connection between shore pipes have not been sufficiently strong to resist the forces normally encountered in dredge pipeline operations. As a result, auxiliary tension resisting devices such as strapping have been used between the couplings of shore pipe to resist separation.

An object of this invention is a bell and spigot connection for pipe such as dredging pipe that provides a smooth bore, self-alignment of connecting pipes and a minimum, if any, gap between the pipes to reduce turbulence and friction loss.

Another object of this invention is a bell and spigot connection for hydraulic dredging pipe which provides a strong physical connection against separation and breakage due to tension, compression and torsion forces, i.e., a physical connection that is almost as strong as that of the pipe itself.

Another object of this invention is a bell and spigot connection for hydraulic pipe in which the packing is trapped between metal-to-metal portions of the bell and spigot ends of the pipes.

Another object of this invention is a bell and spigot connection having an outer metal-to-metal contact between the bell and a stepped ring on the spigot to absorb the axial loading for compression and tension forces, an intermediate sleeve to define a packing gland with the toe of the stepped ring and an inner sleeve to align with the spigot of the pipe to eliminate any gap which would cause turbulence.

Another object of this invention is a bell and spigot connection for pipes that can be assembled by welding together easily formed parts and which does not require any elaborate castings or machined parts for the connection.

Another object of this invention is a rubber sleeve, flexible pontoon pipe connection which replaces the conventional machined ball joint for connecting pontoon pipes.

Other objects ma be found in the following specification, claims and drawings.

BRIEF DESCRIPTION OF THE DRAWINGS

The invention is illustrated more or less diagrammatically in the following drawings wherein:

FIG. 1 is a plan view of a rubber pontoon pipe utilizing the pipe connections of my invention;

FIG. 2 is a view similar to FIG. 1, but showing the rubber pontoon pipe in a bent position;

FIG. 3 is an enlarged, partial, longitudinal cross-sectional view taken along line 3—3 of FIG. 1;

FIG. 4 is a cross-sectional view taken along line, 4—4 of FIG. 1; and

FIG. 5 is an end view taken along line 5—5.

DESCRIPTION OF THE PREFERRED EMBODIMENT

FIG. 3 of the drawings is a partial, cross-sectional view of the assembled pipe connection 11 of this invention. The connection includes a first pipe 13 having a spigot end wall 15. The first pipe has an internal surface 17 and an external surface 19. The second pipe 21 has an end wall 23 which is angled, an interior surface 25 and an exterior surface 27.

A fabricated bell 31 is attached to the angled end wall 23 of the second pipe. The bell receives the spigot of the first pipe to form the connection 11. As is conventional, the first and second pipes and all of the pipes in the dredge pipeline, whether shore pipe or pontoon pipe, are identical in that each has a spigot end and a bell end of the type described herein. However, some of the pontoon pipes are equipped with flexible sleeve portions as will be described hereinafter.

The bell 31 includes a first annular ring 33 having essentially the same interior diameter as that of the second pipe 21, and a slightly larger thickness than that of the first pipe, with the first annular ring welded to the angled end wall 23 of the second piece of pipe. The first annular ring has an end wall 35 which contacts the spigot end wall 15 of the first pipe when the connection is made to eliminate, if possible, any gap between the two pieces of pipe.

A second annular ring 39 telescopes over and is welded to the first annular ring 33, with the second annular ring extending outwardly beyond the end wall 35 of the first annular ring and having its own end wall 41. A third annular ring 45 telescopes over and is welded to the second annular ring 39 and extends longitudinally outwardly beyond said second annular ring a much greater distance than the second annular ring extends outwardly beyond the first annular ring. The third annular ring 45 has an end wall 47. The distance between the end wall 47 of the third annular ring 45 and the end wall 35 of the first annular ring 33 of the bell 31 is predefined so that the spigot end wall 15 of the first pipe 13 will come in contact with the end wall 35 of the first annular ring 33 of the second pipe 21 without leaving a gap which could cause turbulence and friction loss.

A fourth annular ring 51 of greater longitudinal extent than the other annular rings telescopes over and is spaced radially from the third annular ring 45. The fourth annular ring is attached to the third annular ring by sets of arcuately-located spacers 53 which are welded to the third and fourth annular rings. Located at the outer end of the fourth annular ring is an inwardly-projecting lip 55 having arcuately-spaced notches 57 formed therein. The lip extends inwardly but terminates short of the third annular ring 45.

Welded to the exterior surface 19 of the first pipe 13, at a location inwardly of the spigot end wall 15, is a stepped ring 61. The stepped ring has an outer radially-extending annular shoulder 63 facing the spigot end wall 15. This shoulder is located a predefined distance from the spigot end wall 15 equal to the distance between the end wall 47 of the third annular ring 45 of the bell connection and the end wall 35 of the first annular ring 33 of tis connection. This dimensioning positions the spigot end wall 15 in contact with the end wall 35 of the bell connection to eliminate any gap between the first and second pipes.

An inner radially-extending annular shoulder 65 (sometimes referred to as a toe) is located to align with and be spaced from the end wall 41 of the second annular ring 39 to form a packing gland 67 there between the end wall 41 and the toe 65. A packing material 69 is located in this packing gland and is compressed between the annular shoulder 65 and the end wall 41 to prevent leakage through the connection. Also formed on the stepped ring 61 is a longitudinally-extending annular shoulder 71 of a predefined diameter which extends between the radially-extending shoulders 63 and 65. The longitudinally-extending shoulder 71 engage the inner surface of the third annular ring 45 to align the first pipe 13 in the bell connection 31 of the second pipe 21.

A locking ring 75 is slidably mounted on the outer surface 19 of the first pipe 13 on the side of the stepped ring 61 away from the spigot end wall 15. A bead 77 is welded to the outer surface 19 of the pipe 13 to prevent the locking ring from sliding away from the stepped ring 61. A plurality of turn screws 79 extend through the locking ring to engage the stepped ring 61. The locking ring 75 has lugs 81 which fit through the notches 57 in the lip 55 attached to the end of the fourth annular ring of the bell connection when the spigot end of the first pipe is inserted in the bell end of the second pipe. The turn screws are engaged with the locking ring 61 to force the lugs 81 against the lip 55 to tighten the connection between the first and second pipes.

A first pipe 13, such as the pipe previously described, will not only have a spigot end wall 15 but will also have a fabricated bell 31 at the opposite end for connection to the similar pipes. However, such a pipe 13 may also be made into a pontoon pipe connection since the pipes 13 and 21, when they are extended over water, need a flexible connection to absorb the action of waves, wind, etc. Such a pontoon pipe connection is shown in FIGS. 1 and 2 of the drawings. To construct a pontoon pipe connection 91, a pipe such as a first pipe 13 or a second pip 21 is cut intermediate its spigot end wall 15 and its fabricated bell 31, providing a spigot end stub portion 93 and a bell end stub portion 95. The two stub portions are then seated in opposite ends of a reinforced rubber hose 97. A suitable reinforced rubber hose may be obtained from many large diameter hose manufacturers. The rubber hose has an internal surface 99 with entrance sections 101 and 103 at opposite ends thereof of larger diameter to receive the stub portions 93 and 95 of a pipe, respectively, so that the inner surfaces of the stub portions of the pipe are aligned with the inner surface 99 of the reinforced rubber pipe to eliminate turbulence and friction loss. The entrance portions of the reinforced rubber hose may be clamped to attach the hose to the spigot end stub portion and bell end stub portion of the pipe, but the clamps are not shown for clarity of illustration.

In order to prevent separation of the spigot end stub portion 93 and the bell end stub portion 95 from the reinforced rubber hose section 97 due to tension forces caused by wave action, wind, towing action, etc., snubbing cables 105 are provided. In this example, four snubbing cables, each located 90 degrees apart around the rubber hose, are used to limit the degree of deflection of the hose laterally and horizontally to prevent the hose from crimping. As is conventional, the snubbing cables 105 are anchored to ears 109, welded on the spigot end and bell end stub portions 93 and 95, respectively.

FIG. 1 of the drawings shows the pontoon pipe connection in its aligned or untwisted position, while FIG. 2 of the drawings shows it in a bent position in which the snubbing cables 105 prevent pull apart of the connection and also limit the amount of bending of the reinforced rubber pipe 97 to prevent crimping on the side which is on the inside of the bend.

I claim:
1. A smooth bore, self-aligning connection for pipe of the type used in hydraulic dredging, including:
 a first pipe having a spigot end wall and internal and external surfaces,
 a stepped ring attached to the exterior surface of said first pipe inwardly of said end wall, said ring having a step therein forming an outer radially-extending annular shoulder facing the spigot end wall, with the shoulder located a predetermined distance from the spigot end wall, an inner radially-extending annular shoulder facing the spigot end wall and located a shorter distance from the spigot end wall than said outer radially-extending annular shoulder, and a longitudinally-extending annular shoulder of a predetermined diameter extending between said radially-extending shoulders,
 a locking ring slidably mounted on the outer surface of the first pipe on the side of the stepped ring away from the spigot end wall and having arcuately-spaced lugs formed thereon, a plurality of turn screws carried on said locking ring and engageable with the stepped ring to move the locking ring relative to the stepped ring, a second pipe to be connected to said first pipe, said second pipe having essentially the same diameter internal and external surfaces as the first pipe and an end wall with the bell formed on said end wall to receive said spigot end wall of said first pipe, said bell including:

a first annular ring attached to said second pipe at the end thereof, said first annular ring having an internal diameter essentially the same as the internal diameter of said second pipe and an end wall to abut the spigot end wall of said first pipe when the pipes are connected, a second annular ring telescoping over and attached to said first annular ring and extending longitudinally outwardly beyond the end wall of said first annular ring, said second annular ring being aligned with the inner radially-extending annular shoulder of said stepped ring and dimensioned in longitudinal extent to be spaced from said inner radially-extending annular shoulder to form a packing gland when the first and second pipes are connected, a third annular ring telescoping over and attached to said second annular ring and extending longitudinally outwardly beyond said second annular ring, said third annular ring having an inner diameter that telescopes over and engages said longitudinally-extending annular shoulder of said stepped ring and an end wall that engages said radially-extending annular shoulder of said stepped ring at a predetermined distance from said end wall of said first annular ring, and a fourth annular ring telescoping over and spaced inwardly of said third annular ring, said fourth annular ring extending longitudinally beyond the end wall of said third annular ring and being attached to said third annular ring by spacers, an inwardly-extending annular lip affixed to the end wall of said fourth annular ring, with arcuately-located notches formed in said lip to receive the arcuately-spaced lugs of said locking ring, said lugs being engageable with said lip of said fourth annular ring between said notches to lock the spigot pipe to the bell.

* * * * *